US012064777B2

(12) United States Patent
Knight et al.

(10) Patent No.: US 12,064,777 B2
(45) Date of Patent: Aug. 20, 2024

(54) PUMP DISPENSERS

(71) Applicant: RIEKE PACKAGING SYSTEMS LIMITED, Leicester (GB)

(72) Inventors: Simon Christopher Knight, Bridgend (GB); Brian Robert Law, Leicester (GB); Thomas P. Kasting, Fort Wayne, IN (US)

(73) Assignee: RIEKE PACKAGING SYSTEMS LIMITED (GB)

( * ) Notice: Subject to any disclaimer, the term of this patent is extended or adjusted under 35 U.S.C. 154(b) by 0 days.

(21) Appl. No.: 17/948,504

(22) Filed: Sep. 20, 2022

(65) Prior Publication Data

US 2023/0182156 A1 Jun. 15, 2023

Related U.S. Application Data

(63) Continuation of application No. 16/810,968, filed on Mar. 6, 2020, now Pat. No. 11,446,692, which is a (Continued)

(30) Foreign Application Priority Data

Jul. 14, 2014 (GB) ..................................... 1412508
Oct. 20, 2014 (GB) ..................................... 1418585

(51) Int. Cl.
*B05B 11/00* (2023.01)
*B05B 11/10* (2023.01)

(52) U.S. Cl.
CPC ........ *B05B 11/106* (2023.01); *B05B 11/0027* (2013.01); *B05B 11/1001* (2023.01); *B05B 11/1047* (2023.01)

(58) Field of Classification Search
CPC .... B65D 55/12; B65D 55/14; B65D 2401/00; B05B 11/3059; B05B 11/306;
(Continued)

(56) References Cited

U.S. PATENT DOCUMENTS 3,913,772 A 10/1975 Ochs
4,345,691 A 8/1982 Burke
(Continued)

FOREIGN PATENT DOCUMENTS

CN 103879653 6/2014
EP 1559482 8/2005
(Continued)

OTHER PUBLICATIONS

English translation of the description of CN 103879653A, May 30, 2023, EPO.org.*

(Continued)

*Primary Examiner* — Frederick C Nicolas
*Assistant Examiner* — Robert K Nichols, II
(74) *Attorney, Agent, or Firm* — McDonald Hopkins LLC

(57) ABSTRACT

A pump dispenser has a pump body and a reciprocable plunger with a lock-down mechanism, including internal or external lock formations of the plunger and body, such as thread formations, by which the plunger can be locked down for shipping and released subsequently by a rotational release movement. To supplement security for demanding shipping conditions the dispenser also has a supplementary catch mechanism in which respective catch formations of the plunger and body engage selectively in the locked-down position to inhibit the rotational release movement. The catch formations may have circumferentially-directed surfaces which engage between the underside of a plunger head having a shroud and a nozzle and the top of the body beneath the plunger head. They can be released by resilient deformation of one or more of the catch formations.

12 Claims, 13 Drawing Sheets

Related U.S. Application Data continuation of application No. 15/405,386, filed on Jan. 13, 2017, now abandoned, which is a continuation of application No. PCT/GB2015/052021, filed on Jul. 14, 2015.

(58) Field of Classification Search
CPC . B05B 83/22; B05B 11/0027; B05B 11/3001; B05B 11/3047; B05B 11/001; B05B 11/1047
USPC ............. 222/153.01, 153.13, 153.1; 215/330
See application file for complete search history.

(56) References Cited

U.S. PATENT DOCUMENTS

| | | | | |
|---|---|---|---|---|
| 4,524,888 | A | 6/1985 | Tada | |
| 4,538,748 | A | 9/1985 | Ford | |
| 4,589,574 | A | 5/1986 | Foster | |
| 5,307,946 | A | 5/1994 | Molinaro | |
| 5,445,299 | A | 8/1995 | Harriman | |
| 5,615,806 | A | 4/1997 | Grothoff | |
| 5,899,363 | A | 5/1999 | Bliss | |
| 6,308,865 | B1 * | 10/2001 | Lin | B05B 11/1001 222/321.9 |
| 6,367,641 | B1 | 4/2002 | Garcia | |
| 6,604,656 | B1 | 8/2003 | Tseng | |
| 6,966,459 | B1 * | 11/2005 | Tseng | B05B 11/106 222/321.7 |
| 7,802,701 | B2 | 9/2010 | Jahan | |
| 8,444,024 | B2 * | 5/2013 | Kakuta | B05B 11/1046 222/321.9 |
| 8,672,190 | B1 * | 3/2014 | Wang | B05B 11/106 222/321.9 |
| 10,384,223 | B2 | 8/2019 | Espinoza | |
| 10,953,421 | B2 | 3/2021 | Knight | |
| 2008/0251537 | A1 | 10/2008 | Kuo | |
| 2011/0095055 | A1 | 4/2011 | Kakuta | |
| 2012/0104048 | A1 * | 5/2012 | Tseng | B05B 7/0037 222/190 |

FOREIGN PATENT DOCUMENTS

| | | |
|---|---|---|
| EP | 1754542 | 10/2010 |
| JP | S63 20058 | 1/1988 |
| JP | H05 65865 | 8/1993 |
| JP | H08 103703 | 4/1996 |
| JP | 2003191989 | 7/2003 |
| JP | 2003191995 | 7/2003 |
| WO | WO2012001374 | 1/2012 |

OTHER PUBLICATIONS

International Searching Authority, European Patent Office, International Search Report and Written Opinion for PCT/GB2015/052021, mailed Oct. 7, 2015.

* cited by examiner

PUMP DISPENSERS

CROSS REFERENCE TO RELATED APPLICATIONS

This application is a continuation of U.S. patent application Ser. No. 16/810,968 filed on Mar. 6, 2020 (now granted as U.S. Pat. No. 11,446,692), which was a continuation of Ser. No. 15/405,386 (published as U.S. 2017/0128966) filed on Jan. 13, 2017, which was itself a continuation of international patent application serial number PCT/GB2015/052021 (published as WO 2016/009187) filed on Jul. 14, 2015, all of which claimed the priority benefits of GB 1412508.2 filed Jul. 14, 2014; GB 1418585.4 filed Oct. 20, 2014, and U.S. 62/154,172 filed Apr. 29, 2015. All of the foregoing applications are incorporated by reference.

FIELD OF THE INVENTION

This invention relates to pump dispensers of the type in which a plunger operates in or relative to a pump body for pumping.

BACKGROUND

Pump dispensers of the moveable-nozzle type, in which a pump is mounted in the neck of a container by a closure cap, are well-known. Typically a pump dispenser comprises, in addition to the container, a pump module comprising a pump body defining a pump cylinder. The container is usually a plastic bottle, and has a neck with retaining formations. Usually the neck is at the top of the container. The retaining formation(s) may be e.g. a screw thread, snap ring, bead or groove. The pump body is usually mounted by a closure cap thereof, usually a separate component, and typically with an outward flange of the pump body bearing down on the edge of the container neck. The closure cap fixes down onto the neck. The pump body extends down through the container neck into the container interior.

The pump body defines or incorporates a pump chamber with a pump inlet having an inlet valve. Usually a dip tube is provided extending down into the container from the pump inlet. A plunger component including a pump piston, a discharge channel, an outlet valve and a discharge nozzle is operable in the body to change the volume of the pump chamber. The user presses on top of the plunger head to reduce the pump chamber volume and expel product from the nozzle via a discharge valve. A pump spring urges the plunger towards the extended/upward position. When pressure on the plunger is released the spring pushes the plunger out/up, drawing more product into the pump chamber through the inlet valve. Usually the nozzle is part of a laterally-extending plunger head; the nozzle may project generally radially or sideways from the plunger head.

Concepts herein relate to controlling or preventing relative rotation between the plunger and pump body around their common axis. Particular concepts herein relate to a down-locking pump, comprising locking formations which can couple between the plunger and the pump body to hold the plunger in its retracted (down) position, against the spring. This makes it compact for shipping. Down-locking is often by formations making a sloping cam or thread engagement between the plunger stem and the body. Or, the formations may make a simple rotational interlock without cam action. The down-locking formations may be external e.g. near where the stem emerges from the body, or recessed inside the body.

SUMMARY

A pump dispenser construction is disclosed in conjunction with the present invention. FIGS. 1 to 3 show a moveable-nozzle pump with lock-down capability, to illustrate features of a preferred dispenser type in which the present concepts are specifically applicable. FIGS. 1 and 3 are axial cross-sections in the extended and retracted (locked-down) positions. FIG. 2 is an external elevation (without the container) in the extended position.

The pump has a body 1 defining a pump cylinder 9, with an inlet 11 having an inlet valve 112 and connected to a dip tube 6. The body is mounted in a closure cap 5 having internal threads 55 for securing onto the neck of a container, not shown. The top annular edge of the body cylinder 1 projects up through the central hole of the cap 5 and locks (snap) into a downward annular slot of a securing collar 81 of a body insert component 8 whose inner tubular part projects down inside the body cylinder 1. The bottom end 85 of the insert 8 forms a floor which seats the bottom end of the metal pump spring 7 and has a central hole for the plunger stem 2 to pass through. The interior bottom end of the insert also has lock-down threads 83.

The pump plunger 2 has a stem 21 with a thinner lower portion carrying the piston 28 which works in the cylinder 1, and a larger upper portion carrying outwardly-facing lock-down threads 2111 at the bottom of the larger-diameter part. A discharge channel 24 extends up through the stem 21, through a conventional outlet valve 22 e.g. a ball valve and out to the laterally-directed discharge channel in the nozzle 211 of the head 29. The head 29 also has a conventional outer shaped shroud 212 to provide user comfort and an attractive appearance. An external retainer ring or over-collar 82, whose upper diameter closely matches the outer diameter of the upper stem 21, clips onto the top of the insert collar 81 to shield the pump interior and wipe the stem. The extended position is limited by the engagement of the piston 28 up against the lower end 85 of the insert 8.

For lock-down the plunger 21 is fully depressed and turned to screw the stem lock-down threads 2111 into the insert lock-down threads 83, usually at least one turn, say one and a half. The tip of the stem beneath the piston then holds the inlet valve 112 closed (FIG. 3) to prevent leakage through the pump. The closure cap 5 can be removed from the container neck for the user to re-fill the container, which is often a desirable feature with some consumer products.

Such a dispenser construction is reliable and does not leak in normal usage or shipping. Increasingly however there has been a demand for dispensers to be shipped in a filled condition by ordinary post and in various packaging types, e.g. when mailing individually-purchased consumer products rather than commercial lots. This puts a high demand on "shippability" features such as lock-down and sealing. Under repeated shock, vibration and inversion the lock-down threads sometimes work loose so that the plunger rises slightly and product leaks into the packaging.

We propose pump dispensers with novel constructions for preventing or inhibiting relative rotation between plunger and body. In specific embodiments what we propose is that, where the plunger has a lock-down engagement with the body (e.g. with any of a collar, or closure cap, or cylinder, or cylinder insert, or insert interior, or other part of a pump body) as described, and particularly by a screw-thread or other mechanism that operates by rotation relative to the body, the plunger and body have mutually engageable catch formations which engage selectively when the plunger and body reach a fully locked-down condition or position, to prevent or inhibit their relative rotation back away from the locked-down condition.

Aspects of our proposals are set out in the claims.

In a general aspect, we propose a pump dispenser comprising a pump for dispensing fluid from a container to which the pump is attached, the pump comprising:

a pump body defining a pump chamber and a plunger reciprocable relative to the pump body in a pumping stroke to alter the volume of the pump chamber;

a lock mechanism comprising respective lock formations of the plunger and body, the lock mechanism having a locked condition in which the plunger is locked against reciprocation and an unlocked condition in which the plunger can reciprocate for pumping, and in which a release movement of the lock mechanism from the locked condition comprises a relative rotation of the plunger and pump body around an axis of the plunger, and additionally a catch mechanism comprising respective catch formations of the plunger and body which are engageable selectively in the locked condition of the lock mechanism to prevent or inhibit the release movement thereof.

In another aspect we propose a pump dispenser comprising a pump for dispensing fluid from a container to which the pump is attached, the pump comprising a pump body defining a pump chamber;

a plunger having a stem and a head and being reciprocable relative to the pump body in a pumping stroke;

a catch mechanism comprising respective catch formations of the plunger and body which are engageable to prevent or inhibit a relative rotation of the plunger and pump body around an axis of the plunger;

wherein a first said catch formation of the catch mechanism comprises a movable element on one of the plunger head and pump body, having a first circumferentially-directed abutment surface, and the catch formation on the other of the plunger head and pump body has a corresponding oppositely circumferentially-directed abutment surface, said abutment surfaces being engageable to make a catch engagement to provide the engaged condition of the catch mechanism, and the catch engagement being releasable by movement of the movable element against a resilient force to move said abutment surfaces out of engagement.

In a further aspect we propose a pump dispenser comprising a pump for dispensing fluid from a container to which the pump is attached, the pump comprising a pump body defining a pump chamber, the pump body having a top surface and a side surface;

a plunger having a head and being reciprocable relative to the pump body in a pumping stroke;

a lock mechanism for the plunger, and a catch mechanism to prevent relative rotation of the plunger and pump body around an axis of the plunger when locked;

wherein the catch mechanism comprises a movable element on one of the plunger and pump body and a corresponding abutment shoulder on the other of the plunger and pump body, the movable element and abutment shoulder being engageable to make a catch engagement, said movable element having a radially inner portion to engage the abutment shoulder and a radially outer portion comprising an actuation tab for finger pressure, the inner portion of the movable element extending out over the top surface of the pump body, and the radially outer portion with the actuation tab extending down the side surface of the pump body and at a spacing from the body surface, whereby inward pressing of the actuation tab moves the inner portion to release the engagement.

Thus, one component (body or plunger) can have a circumferentially-localised off-centre projection or abutment that engages into or behind a corresponding recess, shoulder or abutment of the other component to prevent or inhibit them from turning back again. A said formation on one component may flex or bend, optionally resiliently, in reaching the engagement position, e.g. it may flex to ride over or past the obstruction of the other component before relaxing back into the engaged (retained against rotation) condition. Thus, the body or plunger may carry a projecting element such as a tab, lug or flange, circumferentially localised or positioned at an appropriate position. This element or projection may be resiliently flexible inwardly or outwardly, or upwardly or downwardly, depending on the orientation of the corresponding abutment or recess on the other component.

The effect is to prevent or inhibit the onset of rotation, e.g. unscrewing, which would initiate release of the pump from its locked-down condition. The engagement may require an initial raised threshold turning force to be overcome before unlocking rotation begins, reducing the chance that this will happen in transit. Or, the mechanism may require a positive unlocking, release or removal of a component by hand before the unlocking rotation can begin. For example, a locking projection on one of the components (body, plunger) may be moveable into a corresponding recess on the other by pushing, flexing or bending it, at least partly in a direction transverse to the rotational relative movement, to keep them from relative turning. Or, a discrete retaining element might be inserted, to engage in or behind respective recesses, abutments or shoulders of both of the body and plunger to prevent or inhibit the initiation of unlocking rotation between them until it is removed or released.

A variety of options exists for the nature, position and relation of the respective catch formations. Desirably they are integral formations with the respective components, e.g. a plunger head and a body top part (collar, cylinder body, cylinder insert or cap). Resilient flexibility is conveniently provided by forming a catch formation as an integral projection or portion of the plunger head or body portion. A predetermined direction of flexing can be provided by a generally flat or flattened form of such an integral projection. In the locked-down scenario, retention is often needed only in one rotational sense so a single circumferentially-directed retaining abutment may suffice, or an opposed pair may be provided. Desirably one formation has an abutment and a slider, ramp or cam formation leading to the abutment over which the other component rides as it approaches the engagement position, where an edge or corresponding abutment on the other component comes into register with the abutment of the first component. As it rides over the ramp or cam it is deformed against resilience—preferably its own bending resilience, or that of the component of which it forms part or to which it is fixed—and then relaxes or clicks into place when the abutments come into register. Preferably one component formation is flexible and the other is substantially rigid where they meet. Or, both may flex. The direction of an abutment surface or shoulder may correspond to a direction in which the flexible element needs to be moved or guided, generally by hand such as by finger pressure, to release the engagement.

Since the catch mechanism may desirably release fully after its resistance has been overcome, e.g. after not more than a turn, or not more than half a turn, the engaging circumferentially-directed abutment desirably has only a small axial overlap so that it rapidly moves out of alignment on turning and does not engage again on the next turn. Where the catch mechanism has plural abutments distributed around the axis, desirably these engage not more than twice on turning and then move axially out of alignment, or they may engage only once. However in some embodiments a repeat of an abutting catch engagement can be useful, as described below.

A further proposal herein is that a lock-down formation on the pump body is provided on an exterior surface, especially on a radially-outwardly-directed surface, of the pump body, and is engaged by the corresponding lock-down formation(s) on an interior or radially-inwardly-directed surface of the pump plunger. This proposal is generally applicable in combination with other proposals herein. For example a pump body may have a top collar or boss portion projecting up with an outwardly-directed side surface, e.g. above a closure cap of the dispenser, and the body lock-down formation may be on this side surface. The plunger may have a plunger head with a downwardly-depending skirt—such as part of a shroud of the plunger head—and this may have an interior lock-down formation engageable with that on the body. These lock-down formations are preferably screw threads or other inclined cam portions.

A further generally applicable proposal herein is that a catch formation of the catch mechanism is or comprises an edge part of a radially-extending reinforcement rib or web on or in the underside of the plunger head. A further proposal is that there may be two or more catch formations distributed circumferentially around the plunger head, e.g. each of them being or being on a respective reinforcement rib as described. The catch formation may be a straight radially-extending edge. It may move over a flat upper surface or deck of the pump body beneath, e.g. of a top boss or collar as described, as the plunger turns. The internal rib or reinforcement portion of the plunger head having the edge need not be entirely nor precisely radial in direction nor parallel to the axis, of course, provided that it provides a generally circumferentially-directed abutment or engagement surface. It may extend substantially radially between an outer shroud and an inner tubular core or stem portion of the plunger head. It may be generally flat and/or upright (parallel to the pump axis). There may be plural, e.g. from 2 to 8, such portions distributed around the plunger.

A catch formation of the pump body may be provided as a recess and/or upward projection providing a circumferentially-directed abutment or engagement surface as mentioned before. This may be for example on a top or upwardly-directed surface of a pump body, such as on a pump body collar or boss as mentioned above. In particular it may be above and/or inside an external lock-down formation of the pump body as described. There may be plural e.g. 2 to 8 catch formations distributed around the pump body. The abutment surface may be provided as part of a directional protrusion or ratchet tooth having a ramp face and an abutment face on opposite sides. In one embodiment, typically when the catch formation is on a said upward surface of the pump body, the ramp surface is upwardly directed and requires axial deformation or flexion of a corresponding catch formation of the plunger to ride over it into catch engagement. In another embodiment a directional protrusion or ratchet tooth is provided projecting radially from the body, e.g. at a raised portion, boss or lip adjacent an opening where the plunger stem emerges from the pump body. Such a radial ratchet tooth may have a ramp face which ramps progressively away from the pump axis to require radial deformation or flexion of the corresponding or complementary catch formation on the plunger. Again, there may be more than one such protrusion or ratchet tooth distributed around the pump body.

It is advantageous to cover the catch formations beneath the plunger head in these embodiments.

A further proposal herein is a bendable or foldable tab element on (or as) a catch formation on the plunger or pump body, preferably on the underside of the plunger e.g. on a rib or web as aforementioned, such as projecting from a lower edge thereof. The tab may bend around to a folded condition as it rides axially and rotationally into engagement against a counter-surface of the opposing component (plunger or body) e.g. acting as a pawl in relation to a directional abutment surface on the other component.

A further proposal herein is a catch engagement having two or more circumferentially-spaced stages of engagement, so that when a first set of catch formations are overridden by sufficient circumferential force, a second set of catch formations comes into engagement and must be overridden in order to release the lock-down formations. For example primary and secondary catch formations may be spaced circumferentially between 1° and 20° apart, usually between 2° and 10° apart. There may be plural primary and plural secondary catch formations for this purpose.

In other embodiments of the catch formations a flexible projection, and especially an integrally cantilevered projection, from the pump body projects out radially, and is flexible in an axial direction i.e. usually up and down. It has a circumferentially-directed edge or shoulder. The plunger, preferably at the underside of the plunger head e.g. beneath the projecting nozzle thereof, carries a rigid counter-abutment formation. One or the other or both components may have an approach ramp to guide the other smoothly to or from the engagement position, without excessive friction or catching. The ramp need not necessarily be inclined to the circumferential direction, especially with a threaded lock-down, because the plunger descends as it turns towards lock-down. This descent may sufficiently deform the movable element for the catch engagement. Conversely, a ramp engagement inclined in the opposite sense, adjacent the abutment or shoulder, may assist smooth disengagement after deliberate actuation of the movable element to release the catch engagement.

Concerning the radially-projecting element on the body in these embodiments, a portion of this may have a generally radially-extending, circumferentially-directed face (abutment shoulder) which clicks into a downwardly-directed recess on the underside of the plunger head having a corresponding abutment shoulder, to prevent relative rotation in the relevant sense whilst they are engaged, until the projecting element is bent down for disengagement. Alternatively, the underside of the plunger head may carry a downward projection with a circumferentially-directed abutment face which clicks down into a recess of the projection.

The intended action in preferred versions of these embodiments is that the user turns the plunger (usually by the head) to the locked condition and the turning action is sufficient to lead the catch formations, with any necessary sliding and deformation taking place automatically under the turning force, to their engaged position.

The desirable shape and disposition of a moveable element such as a bendable projection should take into account that the catch formations should not obstruct use or be visually intrusive, but they must be reasonably easy to operate at least for an adult, while not being liable to become disengaged by casual impacts. To this end, as mentioned, it is desirable to position the engagement parts beneath a projecting nozzle and/or beneath a head of the plunger of the dispenser.

For ease of operation in these embodiments having a moveable element such as a bendable projection, we prefer a movable element having an inner portion which makes the catch engagement and an outer portion constituting an actuating tab for finger pressure so as to be easily accessible. This element may have an inner portion which projects out over the top surface of a body or body cap of the pump, and then bends or angles downwardly to extend down the side surface of the body or body cap. With appropriate spacing, a user can then push or pull the actuator tab towards the body, bending the projection downwards so that the radially-inward movement of the actuator, e.g. in the style of a trigger, moves the inner portion down sufficiently to release the engagement. This arrangement is visually satisfactory, because the release tab does not stick far out, and easy to operate because the downwardly-extending part is not tucked so closely beneath the plunger head that it becomes inaccessible.

The skilled person will of course be able to design suitable variant constructions.

BRIEF DESCRIPTION OF THE DRAWINGS

Preferred embodiments of the proposed invention are now described with reference to the accompanying drawings, in which.

DESCRIPTION OF THE SELECTED EMBODIMENTS

Figure 3:
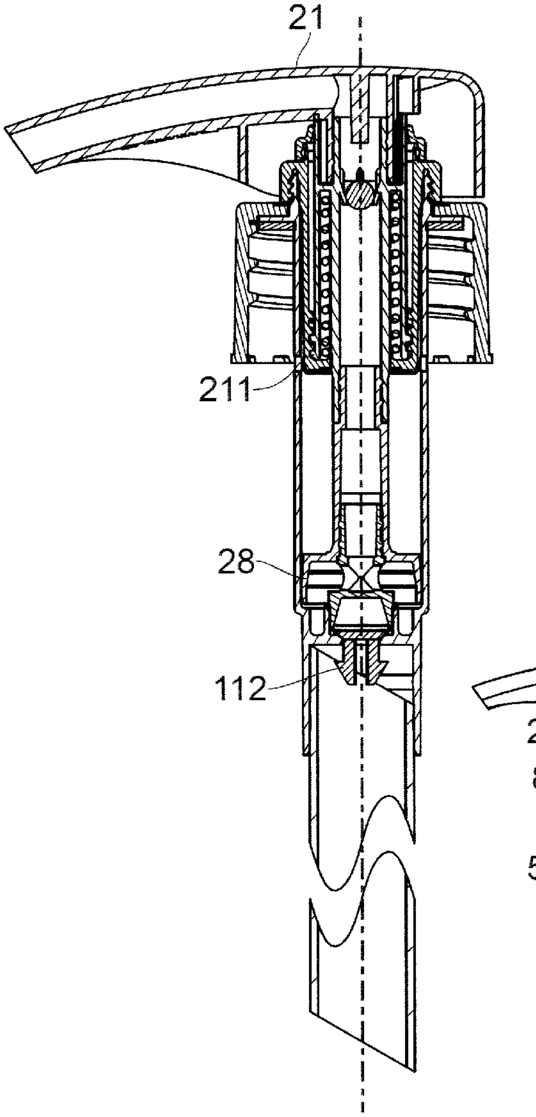
FIG. 3 (PRIOR ART)
FIGS. 1 to 3 are respectively an (extended) axial cross section, an external elevation (extended) and a (retracted) axial cross-section through a dispenser of a first type in which the present exemplary embodiments are specifically applicable.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
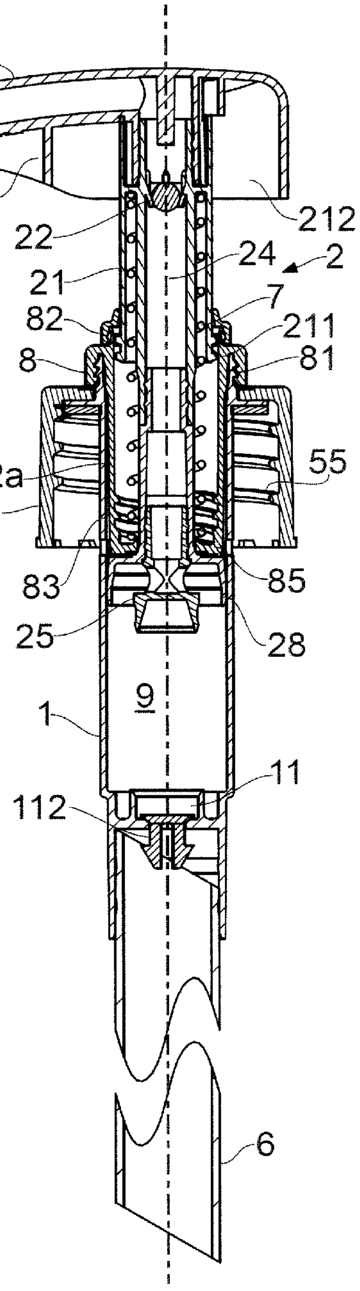
FIG. 1 (PRIOR ART)
Figure 2:
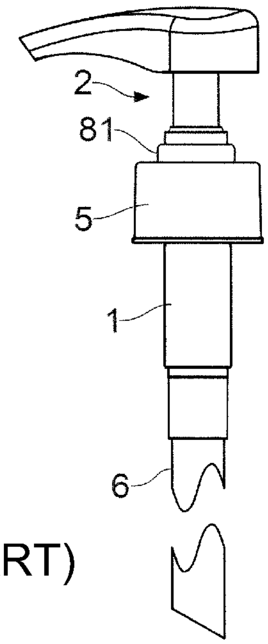
FIG. 2 (PRIOR ART)
Figure 4:
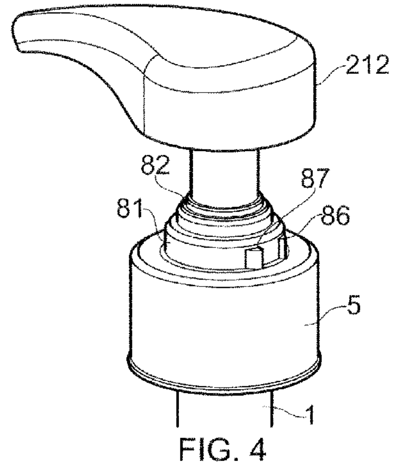
FIG. 4 is a perspective view of the pump dispenser of the FIG. 1 type with a first exemplary embodiment of the present invention of a catch mechanism, shown with the plunger extended (raised).
Figure 5:
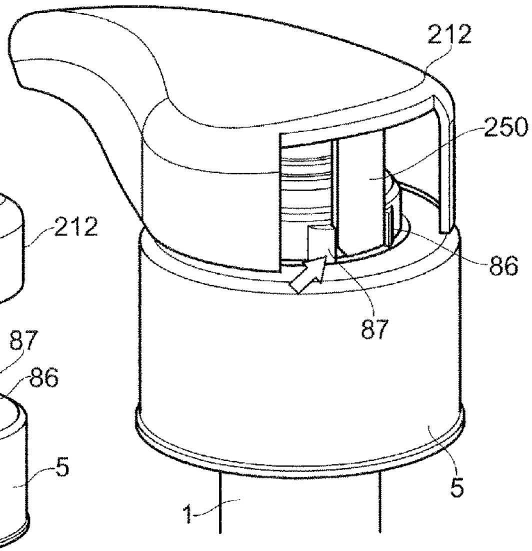
FIG. 5 shows the first exemplary embodiment with the plunger locked down and the catch engaged; the back of the plunger is broken away to show the mechanism.
Figure 6:
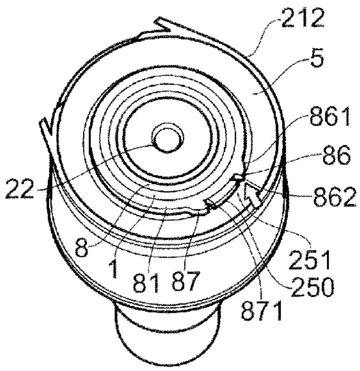
FIG. 6 is a horizontal section through the first embodiment at the level of the catch mechanism.

With reference to FIGS. 4 to 6, a first exemplary embodiment is applied to a dispenser of the FIGS. 1 to 3 type. In FIG. 5 the back of the plunger shroud 212 is shown broken away for illustration. The plunger 2 carries a downwardly-projecting interior tab 250, whose free end is flexible in the radial direction. The outside of the upstanding collar 81 of the body 8 carries a pair of retaining projections 86,87. During normal pump operation, the plunger 2 does not descend fully to meet the closure cap 5. On lockdown however it is turned more than once to engage the lockdown threads 83,2111. As it approaches the lowermost position, the flexible tab 250 moves both down and around, approaching the retaining projections 86,87. The "upstream" (first-reached) retaining projection 86 has a leading ramp or cam surface 861 over which the tab 250 rides, with outward flexing, before clicking back to fit into the gap between the projections. The downstream projection 87 has an abrupt or perpendicular shoulder 871 to prevent the tab 250 from rotating further. The oppositely-directed or trailing shoulder of the upstream projection 86 has a non-perpendicularly inclined ramp surface 862 which is steeper than the upstream side cam surface 861. The tab side edge may be inclined to complement, as shown. This angled engagement controls the threshold force needed to turn the plunger 2 back in the anticlockwise direction, bending the tab back around the upstream projection 86 to commence the unlocking rotation.

Figure 9:
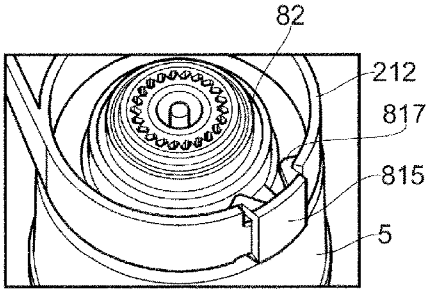
FIG. 9 is a horizontal (radial) section at the level of the catch mechanism to show its engagement.
Figure 7:
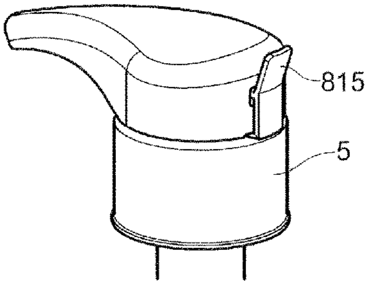
FIG. 7 is a perspective view of a second exemplary embodiment of the present invention of a catch mechanism in the locked-down and retained position.
Figure 8:
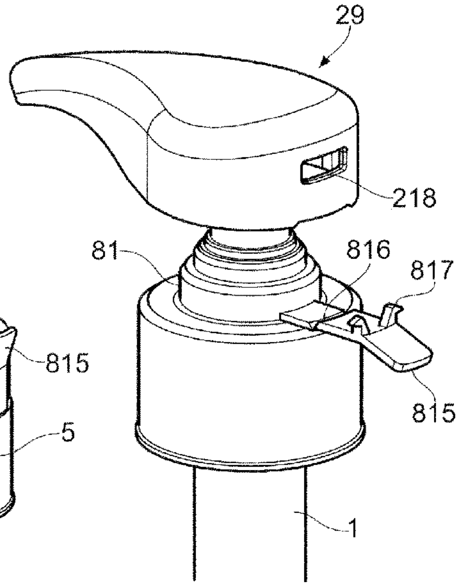
FIG. 8 shows the second exemplary embodiment with the plunger raised, before locking down.

FIGS. 7, 8 and 9 show a second exemplary embodiment of the present invention. Here the back of the plunger shroud 212 has an opening 218 and the body collar 81 has an outwardly projecting flexible segmented tab 815 with a hinge 816 so that it can fold up behind the plunger head and a pair of resilient retaining hooks 817 which can be pushed in through the hole 218 in the plunger shroud, as seen in FIG. 9, to prevent rotation of the plunger 2 after it has been turned to the fully locked-down position. To unlock the plunger the tab 815 must be pulled away, e.g. broken away, from the pump body. This cannot happen in transit so sealing is maintained.

Figure 10:
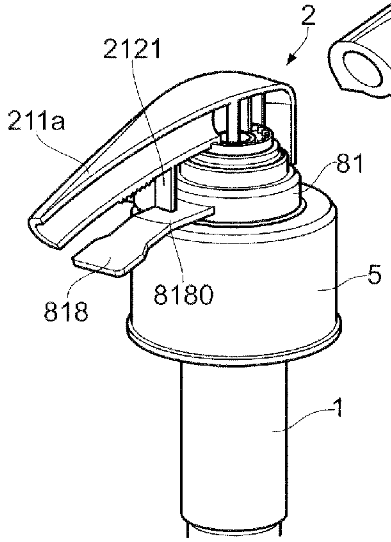
FIG. 10 shows a third exemplary embodiment of the present invention of a catch mechanism implemented in the pump dispenser of the FIG. 1 construction, FIG. 10 being a perspective view with a vertical median section through the discharge nozzle to expose the mechanism below.
Figure 11:
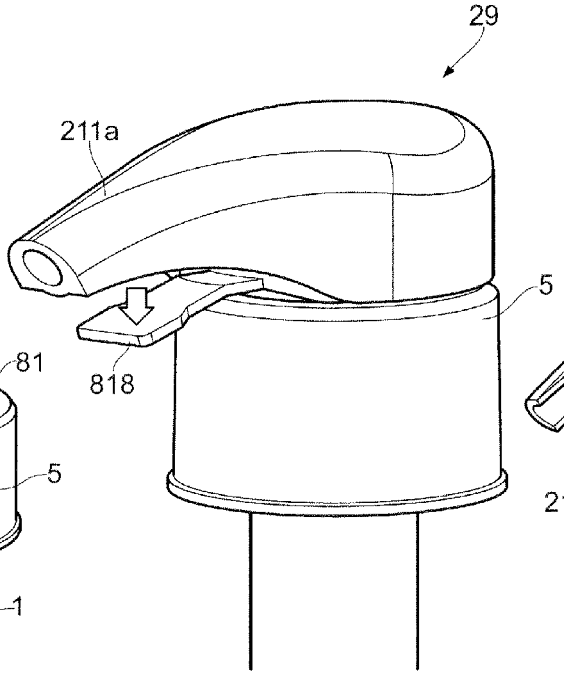
FIG. 11 shows the FIG. 10 dispenser in the same position—locked down—and without the cross-section to illustrate the disposition and action of the release tab.
Figure 12:
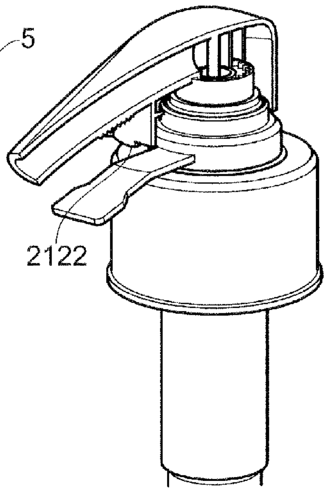
FIG. 12 shows the same condition as FIG. 10, with the plunger partly raised.
Figure 13:
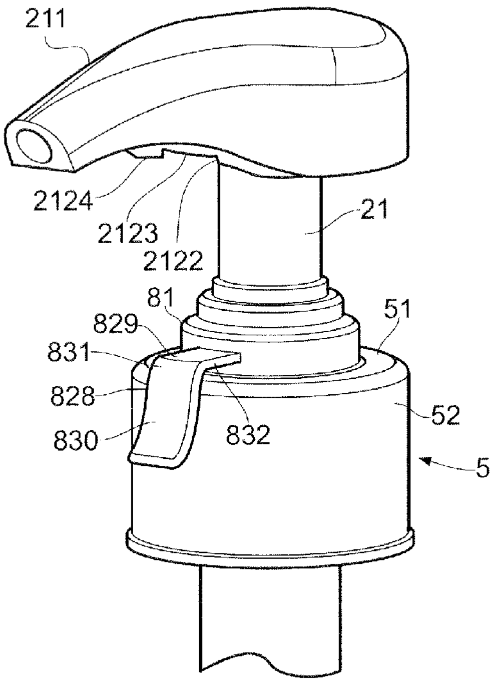
FIG. 13 shows a fourth exemplary embodiment of the present invention of a catch mechanism, with the plunger raised.

FIGS. 10, 11 and 12 show a third exemplary embodiment of the present invention. Here the body carries a projecting tab 818 which is resiliently flexible in the vertical (axial) direction. The plunger 2 carries a rigid abutment shoulder 2122, circumferentially-directed, at a position radially spaced from the axis. In this case, the shoulder 2122 is provided as a slight projection on a strengthening web 2121 which is anyway known to be provided beneath the nozzle 211*a* of the plunger; see FIG. 1. After filling, the plunger 2 is screwed down for lockdown. As lock-down approaches completion, the rigid web projection 2121,2122 abutment on the underside of the nozzle 211 rides over the middle 8180 of the projecting springy tab 818 in the clockwise direction, deflecting it downwardly, and then the tab 818 clicks back up into place behind the abutment shoulder 2122 preventing the head from being unscrewed. To unscrew and thereby unlock the head, the tab 818 must first be depressed. Positioning the tab 818 beneath the nozzle 211 helps to prevent accidental depression.

FIGS. 13 to 16 show a fourth embodiment of the present invention. Here the flexible actuating tab 828 of the catch mechanism has a more ergonomic form, projecting out initially from the (integral) body collar 81 horizontally and radially, over the top surface 51 of the body cap 5. As before, the circumferentially-directed side edge 832 of this radially inner part of the tab 828 provides the necessary abutment to interact with the corresponding abutment edge 2122 of the locating slot 2123 on the underside of the plunger above. As before, this locating slot 2123 is formed adjacent to or as part of a transverse reinforcing web on the underside of the plunger head nozzle. This web has inclined ramp surfaces 2124 to either side of the slot, to help guide movement of the plunger smoothly relative to the body as it is screwed down on and off the catch mechanism in use.

This embodiment differs from the previous embodiment in that where the tab 828 reaches the edge of the cap 5 it has a downward bend 831 leading to an actuating tab portion 830 projecting in a generally axially downward direction down the side surface 52 of the top cap 5, and at a radial spacing from it. As seen better in FIG. 14, this form of the actuator tab 828 is less obtrusive. The trigger-like disposition of the actuator portion 820 is convenient for the user, who can easily squeeze it towards the cap 5 with a thumb or finger, bending it down from its root where it meets the body collar and thereby pivoting its inner portion 829 down and out from engagement in the slot 2123 in the plunger above.

As before, the resilient projecting tab 828 lies beneath the projecting nozzle 211 in the engaged position, to help protect it from disturbance and accidental release in ordinary handling or transit.

Figure 17:
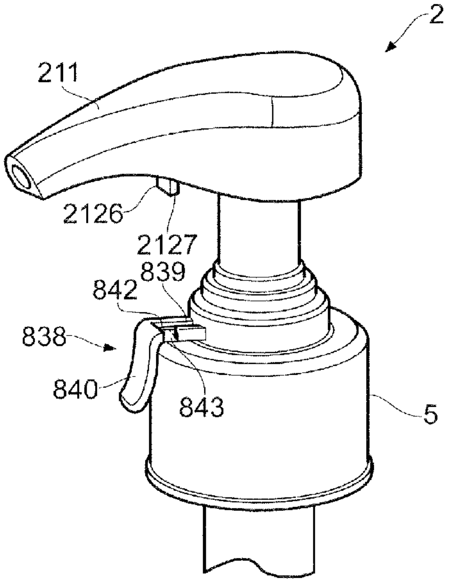
FIG. 17 is a view of a fifth exemplary embodiment of the present invention with the plunger raised.
Figure 14:
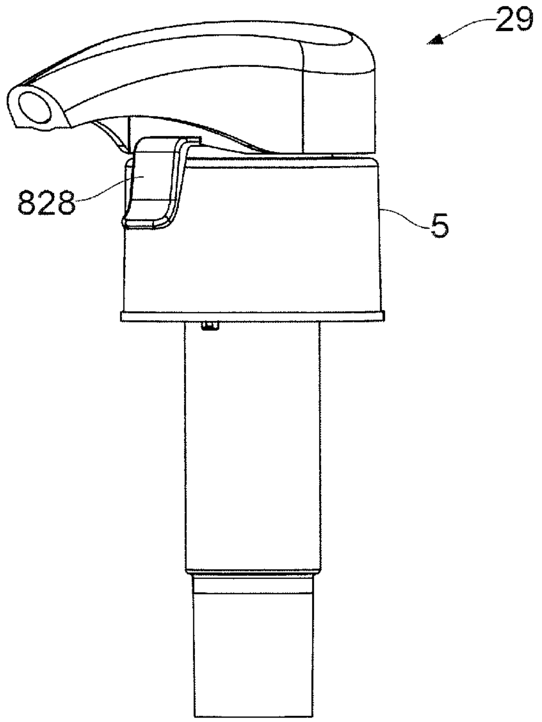
FIGS. 14 and 15 are oblique views and front views of the fourth exemplary embodiment with the plunger fully locked down.
Figure 15:
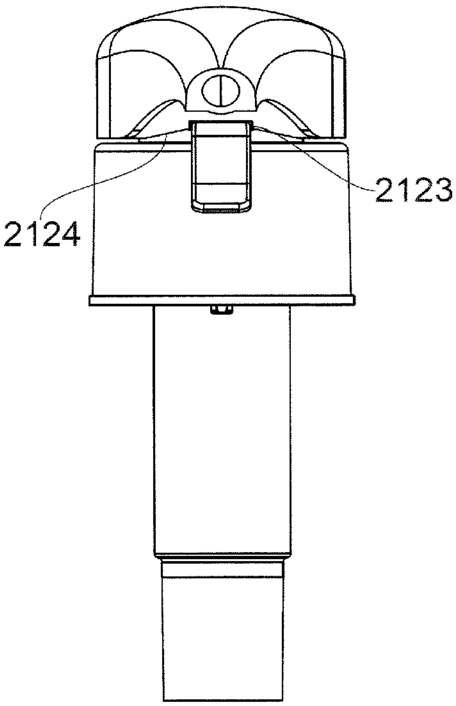
Figure 16:
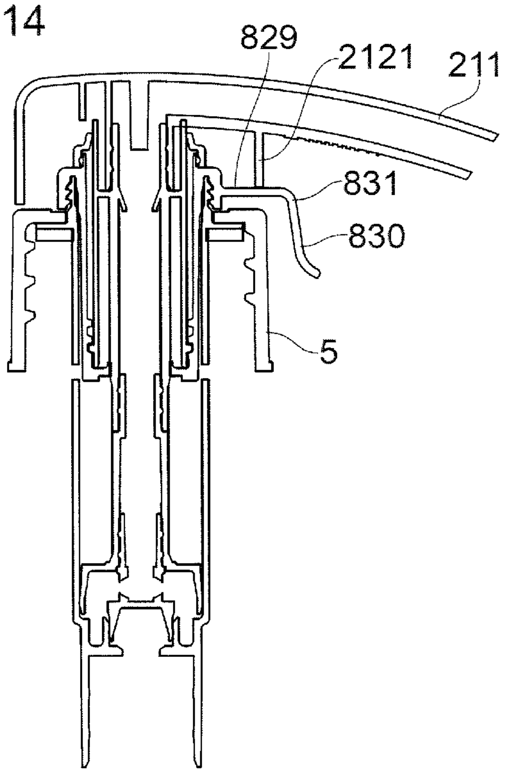
FIG. 16 is a schematic axial section perpendicular to FIG. 15.

FIG. 17 shows a further exemplary embodiment of the present invention. Here again the actuating tab 838 takes the trigger-like form with the outward inner part 839 and the downward outer actuating part 840. However the nature of the engaging abutment forms on the plunger and projection 838 is different. Here the underside of the plunger carries a downwardly-projecting peg or key 2126 with has a simple square-form circumferentially-directed abutment face 2127. Were this square formation to be turned into engagement with a simple tab 828 as seen in the previous embodiment, they could not readily move over or past one another. In this embodiment a ramp or slide form 843 is therefore provided on the tab 838, where the key 2126 will rotate into engagement with it as the plunger head is locked down. The cam engagement with the ramp 843 then bends the tab 833 down under the key until the key 2126 reaches a central hole 842 in the tab into which the key fits: the tab then springs up again and the plunger 2 is held against rotation by the abutment edge of the hole until the actuator 840 of the tab is deliberately pressed to release it.

Figure 18:
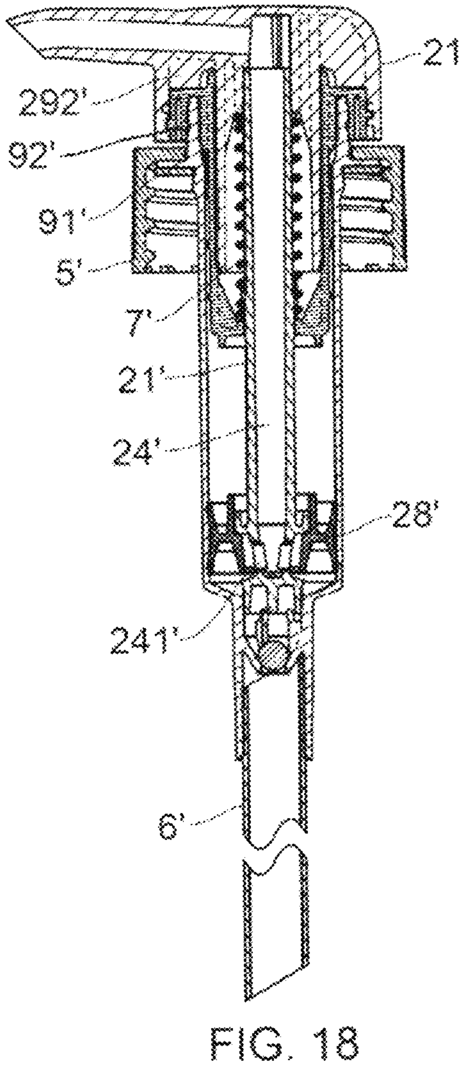
FIG. 18 is an axial cross-section through a second type of pump dispenser, with the plunger in a retracted (locked down) position.
Figure 19:
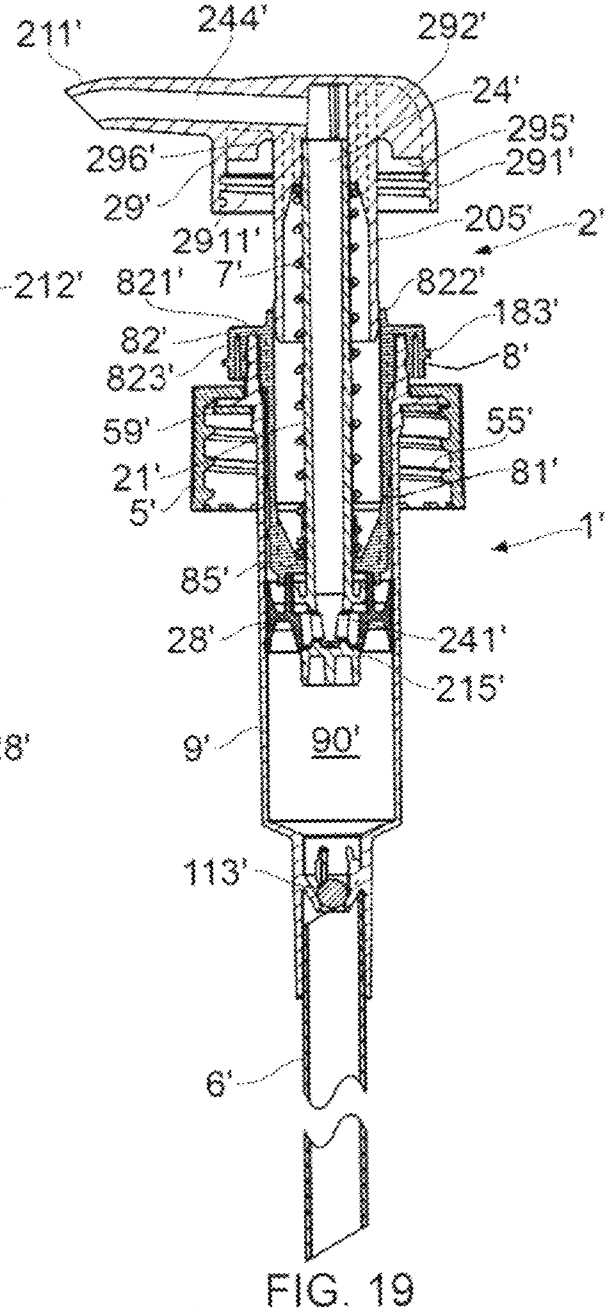
FIG. 19 is a similar view with the plunger in the extended position.
Figure 20:
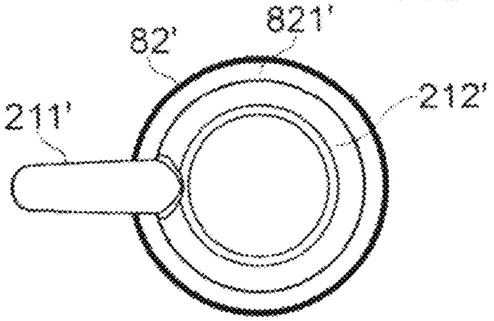
FIG. 20 is a top view.

FIGS. 18 to 20 show a moveable-nozzle pump with lock-down capability: another preferred type of dispenser in which the present proposals are implemented.

The pump has a body 1' and a plunger 2', with a closure 5' with internal threads 55' for mounting the pump on the neck of a container, not shown.

The body 1' comprises a cylinder component 9' and a body insert component 8'. The cylinder component 9' has a top annular rim 92' projecting up through a hole in the cap 5' and a radial flange 91' engaged beneath the cap, so that the cap 5' clamps the flange 91' down against the top of the container neck in use through a sealing gasket 59'. The main lower part of the cylinder component 9' projects down axially into the container interior, converging at its bottom end to define an inlet valve seat for an inlet valve 113' e.g. a ball valve, and a socket for a dip tube 6'.

The body insert component 8' is also generally cylindrical in form and comprises an inner tubular part 81' and a top collar 82'. The inner tubular part 81' fits down inside the body cylinder 9' with a slight radial clearance (maintained by small protecting nibs) to about half the axial depth of the cylinder, and has a partly closed bottom end 85' with a central opening for passage of the stem 21' of the plunger 2' (to be described). The internal floor formed at the bottom end 85' around this hole serves as a seat for the bottom end of a pump spring 7'. At its top end the insert 8' has a radially projecting collar 82' with an upward surface or deck 821' facing up towards the head 29' of the plunger 2' and a downward peripheral skirt 823' formed in two concentric layers, the inner having snap formations for engaging onto the top rim projection 92' of the cylinder component 9', and the outer carrying an external lock-down thread 183'. Adjacent the cylinder rim 92' the inner part of the insert component 8' has a circumferential series of short longitudinal fins 825' (see also FIG. 33). With the slight clearance between the two concentric walls of the collar skirt 823', which allows slight flexion of the inner wall with the snap formations, this fitting arrangement allows a very tight and secure snap fit between the body components 8',9' but without distortion of the exterior of the collar skirt 823' carrying the lock-down thread 183.

The pump plunger 2' has a stem 21' as mentioned, with a head 29' at the top having a laterally-directed nozzle 211'. The head 29' has a shaped outer shroud 212' to provide user comfort and an attractive appearance, and an inner tubular downward extension 205' into which the tubular plunger stem 21' is plugged, with annular clearance between them to receive and seat the top end of the pump spring 7'. The outer shroud 212' has a depending cylindrical skirt portion 291' at its bottom edge, dimensioned to fit closely around the body collar 82' and having internal lock-down threads 2911' engageable with the external lock-down threads 183' of the collar 82' by turning the head 29'. The head also features a set of internal reinforcing webs 292', each with a straight lower edge 295' forming a radial rib. When the plunger is screwed down onto the collar into the locked-down position shown in FIG. 18, these edges 295' act together as stop abutments against the flat top surface or deck 821' of the collar 82' so that the plunger cannot be over-tightened and cause damage. In this embodiment there are four reinforcing webs or stop ribs 292' (compare FIG. 21). Each also has a recessed portion at its inner end providing an inwardly-directed edge portion 296': these recesses provide clearance for an upwardly-projecting inner lip 822' of the collar which wipes the outer surface of the tubular plunger extension 205'.

The plunger stem 21' defines an internal discharge channel 24' extending up from a set of radially-directed inlet openings 241' in the stem at its bottom end to a further discharge channel portion 244' through the nozzle 211' of the head 29'. At the bottom of the stem 21' a piston 28' forms a sliding seal. In addition to its outer double lip wiping the inner wall of the pump cylinder 9', and defining with it a pump chamber 90', the piston has a limited axial sliding movement relative to the plunger stem 21' between a closed position in which it closes off the inlet openings 241' (as seen in FIG. 19, where the seal is pushed to its lowest position relative to the stem 21' by abutment of its upper projection against the bottom end 85' of the insert component 8' under the urge of the pump spring 7'), and an open position in which it allows access to the openings 241' when the sliding seal 28' moves to its upper position relative to the stem 21' (as seen in FIG. 18; the sliding seal also takes this relative position as the plunger is being depressed so that product can flow out from the pump chamber 90 through the discharge channel 24'). The sliding seal piston 28' and the stem 21' have opposed shoulder portions providing stop abutments at either end of this range of sliding. In the locked-down position (FIG. 18) an end plug portion 215' of the stem blocks the inlet valve conduit altogether, so that there is no flow through the pump. Outlet flow can occur only as the plunger is being depressed. The sliding seal piston 28' has the advantage that product cannot be expelled through the pump by squeezing the container, whatever the position of the plunger.

Figure 21:
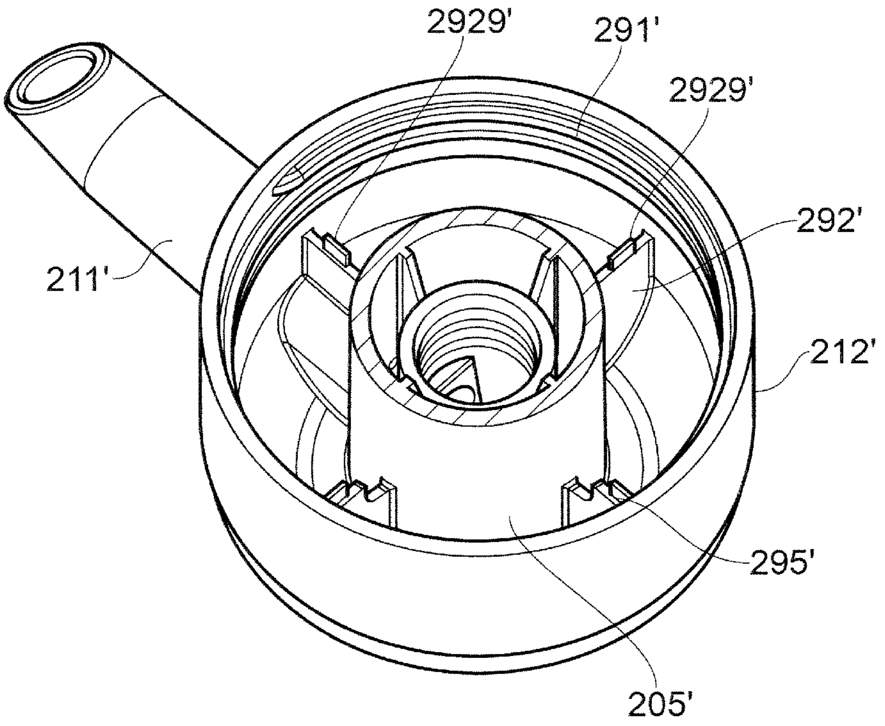
FIG. 21 is a partly-sectioned view showing the underside of the plunger head, with a sixth exemplary embodiment of the present invention of a catch mechanism.
Figure 22:
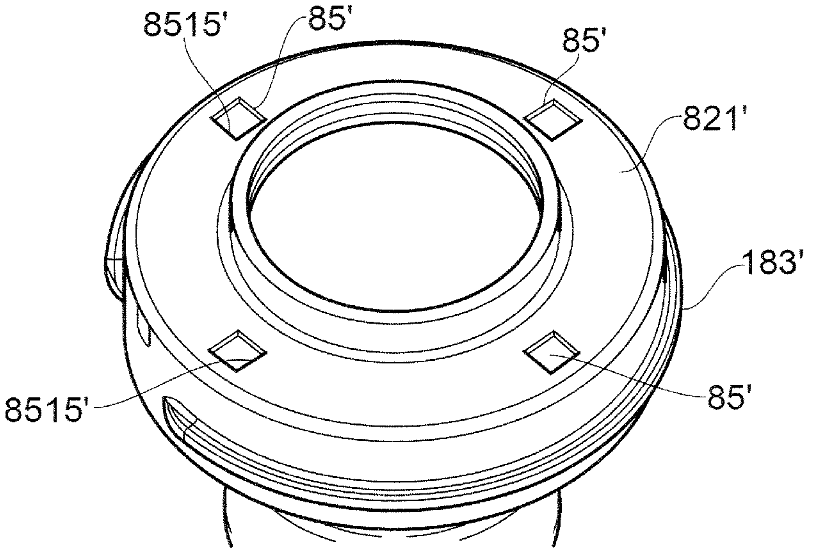
FIG. 22 shows the top of a pump body collar in this sixth exemplary embodiment.

FIGS. 21 and 22 show a sixth exemplary embodiment of a catch mechanism. The underside of the plunger is provided with a plurality of catch formations by using the downward edges or radial ribs 295' of the internal plunger head reinforcement webs 292'. In this embodiment the radial edges 295' are enhanced with thinner foldable tabs 2929' formed integrally. Correspondingly, the top surface or top deck 821' of the pump body collar—see FIG. 22—has a set of four receiving pockets 85' spaced equidistantly around it, each wide enough to receive one of the plunger tabs 2929'. Each receiving pocket 85' has an abrupt or perpendicular abutment surface 8515' facing clockwise, i.e. opposing the direction of unscrewing of the lock-down threads 183',2911'.

Figure 23:
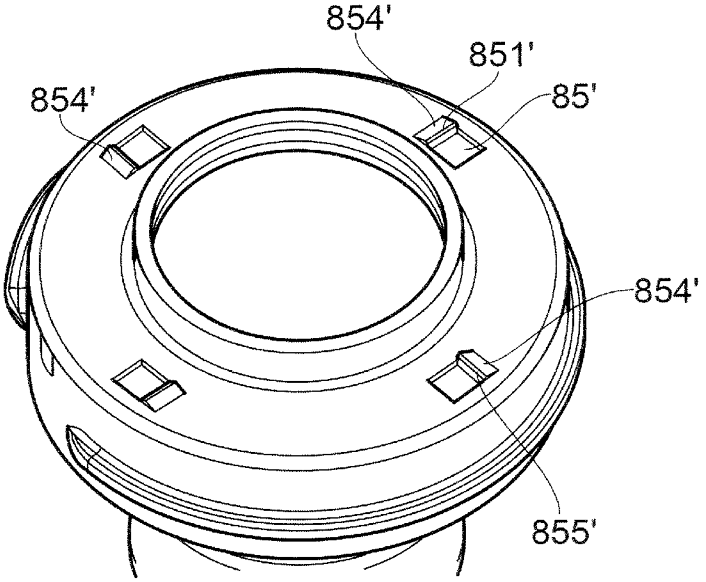
FIG. 23 shows a variant of the top of the pump body collar for the sixth exemplary embodiment.
Figure 24:
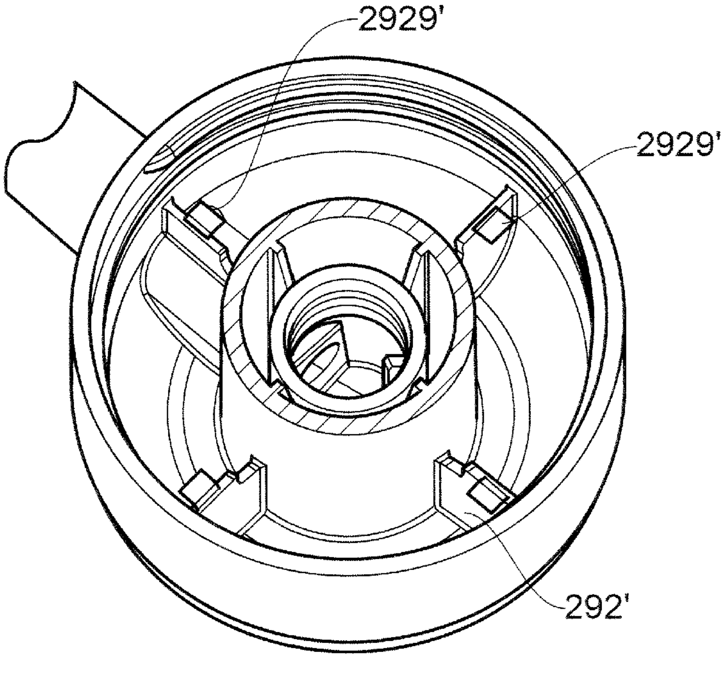
FIG. 24 is a view of the underside of the plunger head corresponding to FIG. 21, showing the catch mechanism formations as they would be after engagement with the body collar (not shown in the figure).
Figure 25:
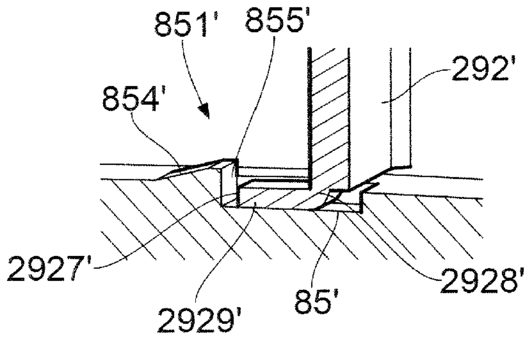
FIG. 25 is an enlarged cross-sectional detail of the catch mechanism formations in the engaged condition of the sixth exemplary embodiment.

FIG. 23 shows a variant embodiment in which the height of these abrupt abutment faces 855' is enhanced by building up from the surface of the deck 821' a ratchet tooth formation 851' having the abrupt face 855' and a ramped face 854' in the opposite direction. This increases the depth of the face 855' without requiring thicker material for the top of the collar. In use, for locking down the pump plunger 2', e.g. for shipping, it is pushed down and rotated clockwise to engage the lock-down threads 183',2911'. As these move further into engagement, the projecting tabs 2929' gradually come into engagement with the top 821' of the body collar 82', sliding over its surface and progressively folding around their hinge regions 2928' (where they join the more rigid reinforcing web 292' above: see FIG. 25). As lock-down approaches completion the four tabs just reach their assigned pockets 85' with the tabs now 2929' folded flat. The end faces 2927' of the tabs now face the perpendicular abutment faces 8515' or 855' of the respective pockets as shown in FIG. 25. In the variant embodiment of FIGS. 23 and 25, the ramp faces 855' help the tabs and webs 2929',292' to deform sufficiently to reach their eventual pockets 85'. From this position, unscrewing the lock-down requires the tabs to be broken away from their corresponding rib edges or reinforcing webs 292',295'. This requires substantial force, providing an effective catch against accidental unlocking of the plunger. However once this initial release force has been applied by a knowledgeable user, the lock-down can easily and repeatedly be released thereafter.

Of course the numbers of tabs and pockets need not be four, and indeed need not be the same. Having plural tabs enables the override force for release to be adjusted in relation to the ease of folding the tabs into the pockets 85' when locking down initially.

Figure 26A:
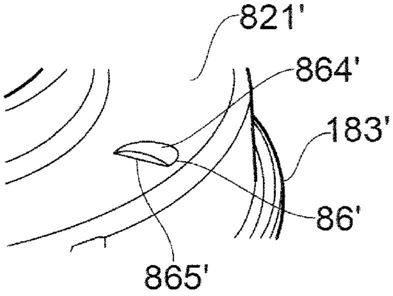
FIGS. 26(*a*) and 26(*b*) are alternative forms for catch mechanism formations on the pump body collar, in a seventh exemplary embodiment of the present invention.
Figure 26B:
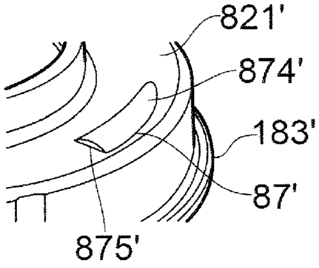

The described folding tabs give strong rotational directionality to the catch mechanism even if this is absent in the pockets of the pump body (as in FIG. 22). It is possible for directionality to be provided only by the body formations. FIGS. 26(*a*) and 26(*b*) show the top surface 821' of the body collar with a directional catch protrusion or ratchet tooth 86',87' having a perpendicular or abrupt abutment face 865',875' and a sloping ramp face 864',874'. In FIG. 26(*b*) the ramp face 874' is more gently sloping than the ramp face 864' in FIG. 26(*a*), but they are the same in principle. Usually there will be the same number of these pawl protrusions 86',87' as there are radial ribs to engage them on the plunger, although this is not critical.

Figure 27A:
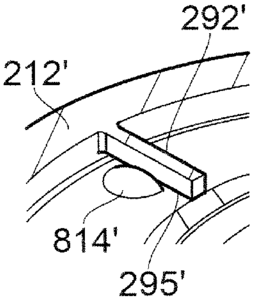
FIGS. 27(*a*) and 27(*b*) are fragmentary sectional views showing a lower part of the plunger head and a radial catch rib thereof engaging with the pump body collar catch formation of FIGS. 26(*a*) and 26(*b*) respectively.
Figure 27B:
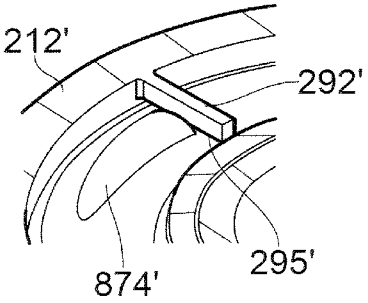

FIGS. 27(*a*) and 27(*b*) show that the simple lower edges 295' of the reinforcing webs 292' can now act as effective locking ribs themselves, with minor flexion initiated by riding up the ramp surfaces 864',874', to be retained by the abutment surfaces 865',875' and constitute the catch mechanism.

Figure 28:
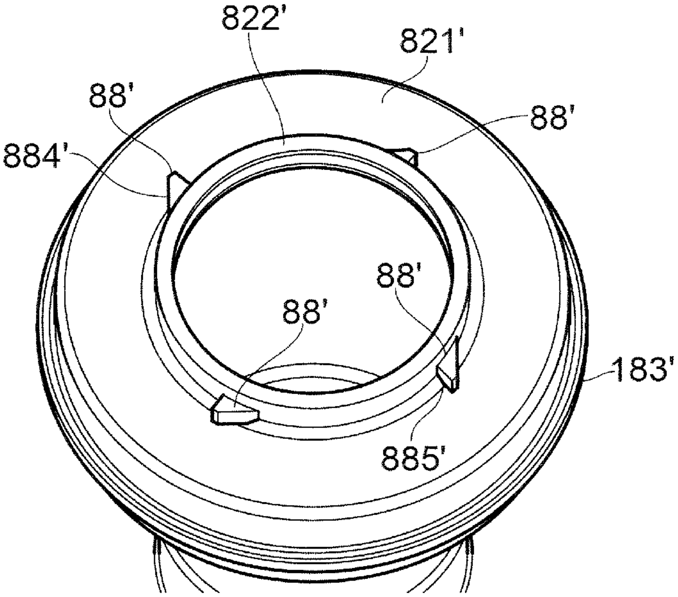
FIG. 28 is a view of the top of the pump body collar showing catch mechanism formations in an eighth exemplary embodiment of the present invention.
Figure 29:
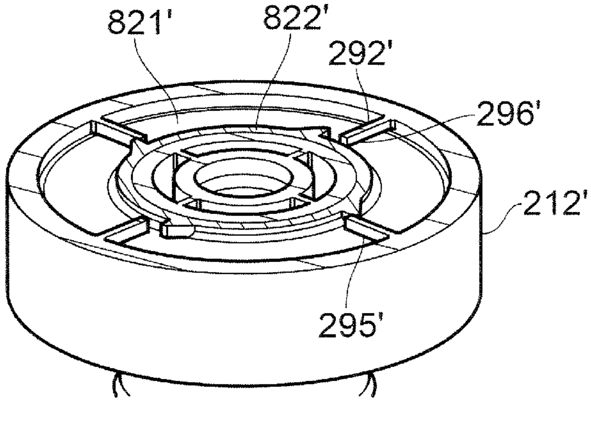
FIG. 29 is a cross-section through the eighth embodiment with the plunger head in place, just above the level of the top of the pump body collar and with the components sectioned perpendicular to the pump axis, showing the catch mechanism engaged in a locked-down condition of the dispenser.

FIGS. 28 and 29 show an eighth exemplary embodiment of the present invention with a different disposition of directional or ratchet tooth-type catch protrusions 88',88". In the sixth and seventh embodiments the ramp surfaces rose in the axial direction, requiring corresponding axial flexion of the ribs or tabs on the plunger head (relative to the head) to reach the engagement position. In the eighth exemplary embodiment of the present invention the pawl protrusions or ratchet teeth 88',88" project radially outwardly from the inner annular lip 822' of the body collar 82'. As before, each ratchet tooth protrusion has an abrupt abutment face 885' and a sloping ramp face 884', but here the ramp face 884' slopes outwardly relative to the circumferential direction i.e. so that a rotating counter-formation to engage with it must deflect or flex radially outwardly to reach the engaged position. In this embodiment this is again achieved using the form of the reinforcing webs 292' inside the plunger head, which have an inwardly-directed or axially-extending edge 296' (as mentioned above) to engage with the pawl protrusions 88'.

A particular feature of this embodiment is the provision of a two-stage catch engagement. Specifically, the four ratchet tooth protrusions are provided as a primary pair 88' and a secondary pair 88". In each pair the two protrusions are diametrically opposite. However the secondary protrusions 88" are more than 90°—say about 95°—behind the primary protrusions 88'. So, in the locked-down and catch-engaged position shown in FIG. 29 (with a cross-section right through the plunger shroud 212' and body collar 82'), the inward catch edges 296' of all four ribs 292' have ridden past a respective pawl protrusion 88',88" but the primary protrusions 88' by their abutment contact hold the secondary protrusions 88" out of engagement with their respective ribs 292'. Should some impact or disturbance override the primary engagements, the secondary engagements act as a back-up so that even after a single impact strong enough to disturb the catch mechanism, the catch mechanism still offers a secondary engagement able to protect the locked-down condition of the plunger. However the primary and secondary engagements are sufficiently angularly close that a steady rotational pressure such as exerted by a user deliberately unlocking the plunger readily overcomes both together.

It will be noted that in the embodiments the axial extent of the abutment engagements between the catch formations is small relative to the overall pitch of the lock-down threads so that even half a turn of the lock-down threads carries the pump and plunger catch formations out of axial register with one another. After the initial resistance offered by the catch mechanism, the lock-down can be released against only the friction of the threads, without inconvenient intermittent extra resistance from the catch mechanism.

Figure 30:
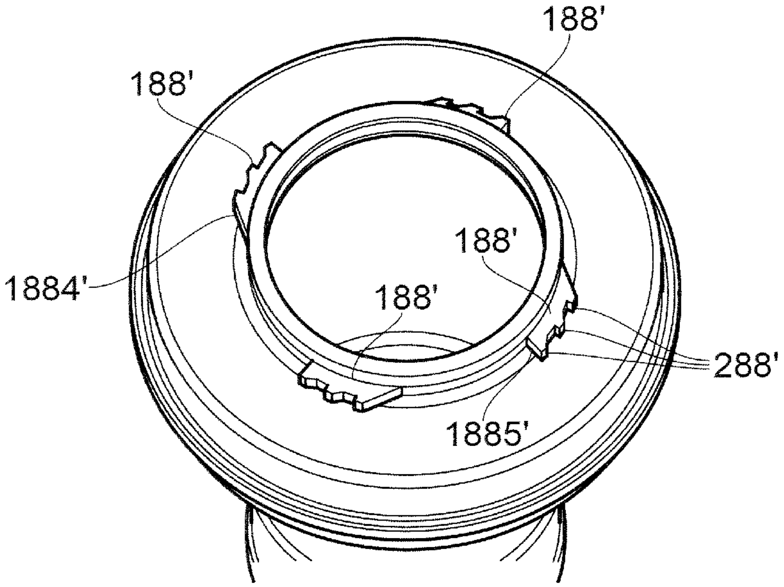
FIGS. 30 and 31 are views of a ninth exemplary embodiment of the present invention, corresponding to FIGS. 28 and 29.
Figure 31:
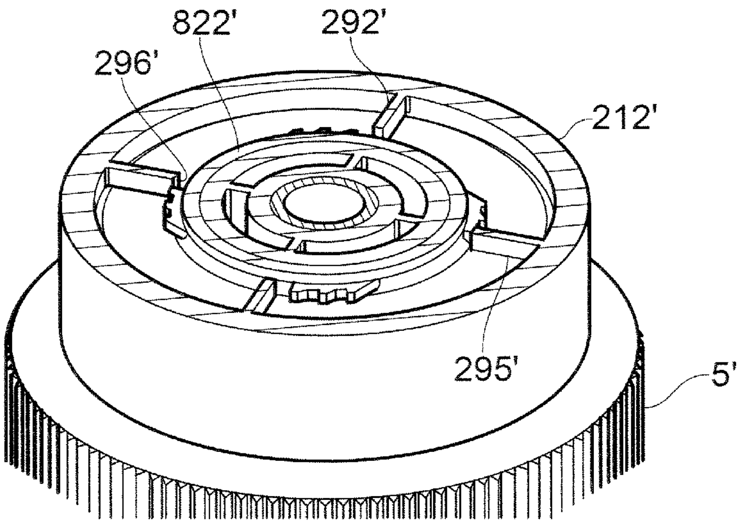

FIGS. 30 and 31 show a variant relative to the eighth exemplary embodiment. Here, each catch protrusion 188 with ratchet tooth form is provided as a set of multiple subsidiary protrusions 288' (here three) each having a ratchet tooth form with a leading ramp 1884', and an abutment face 1885' facing clockwise. As in the previous embodiment they are provided as a primary pair 188' and a secondary pair 188" which is non-orthogonal to the primary so that the secondary acts as a back-up to the primary. Having plural teeth 288' in each set increases the resistance of each tooth set to being overridden, for more robust performance if desired.

Figure 32:
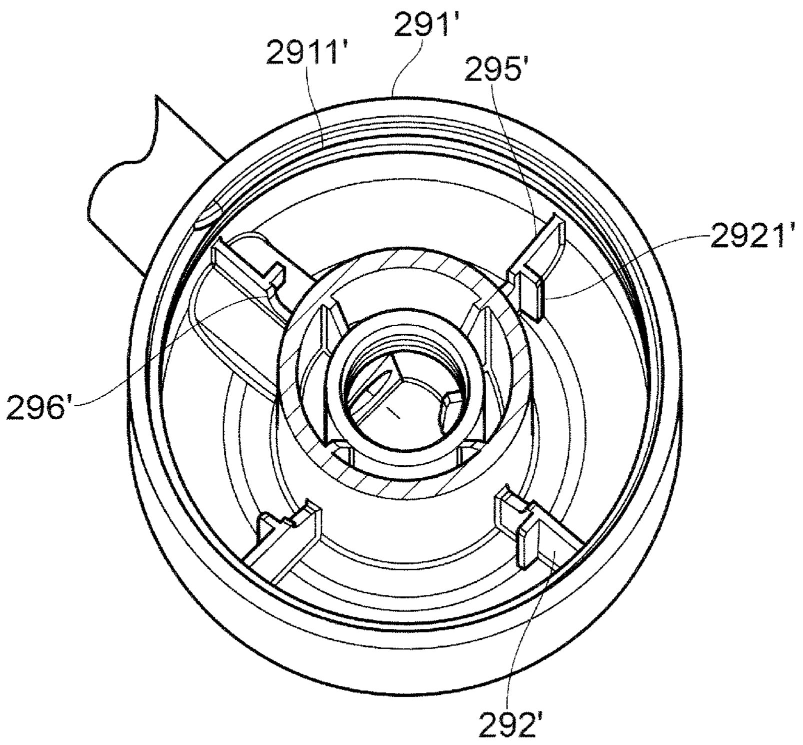
FIG. 32 shows a variant construction for catch ribs of the plunger head, applicable with any of the sixth to ninth exemplary embodiments.

FIG. 32 shows a further modification for adjusting the force required to override the catch engagement. Since this is governed primarily by flexion of the radial ribs or reinforcement web portions 295',292' on the underside of the plunger, these portions can be provided with supplementary reinforcement ribs such as indicated at 2921' to increase their stiffness against the mode of flexion corresponding to release from the catch engagement. The provision of such ribs is preferred to general thickening of the components.

Figure 33:
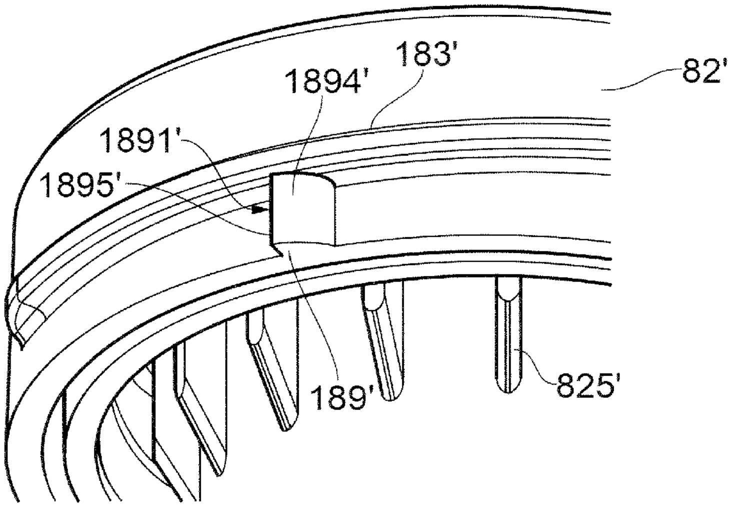
FIG. 33 is a fragmentary enlarged view at the periphery of the pump body collar (shown separately from other components) showing a separate or supplementary option for a catch mechanism.

FIG. 33 shows a supplementary option in which a tooth protrusion 189' with a sharp edge 1891' between a lead ramp face 1894' and a clockwise-directed abutment face 1895' is provided on the outer surface of the pump body collar adjacent the thread form 183' for lock-down. As the corresponding thread 2911' of the plunger head skirt rides around under the thread 183' of the body collar 82', it must ride over the sharp edge of the protrusion 189' which then bites into it and increases the torque needed to unscrew the plunger head.

The skilled person will appreciate that the principles for making catch engagements and lock-down engagements embodied in the above examples may also be embodied in numerous other ways without changing the nature of the invention. For example, while the lock-down between external threads of the body and internal threads of the plunger head is shown in the sixth to ninth embodiments, the illustrated catch mechanisms could equally be used with different kinds of lock-down formations, e.g. lock-down formations recessed down into the pump body and/or involving external threads on the plunger and internal threads of the body, such as shown in the first general pump type and first to fifth embodiments above.

While it is convenient to use internal reinforcement webs of the hollow plunger head to provide catch engagements for the pockets or ratchet tooth formations of the body as shown, such catch formations could be provided at different portions of the plunger head. Indeed, depending on the situation, it might be that the ratchet tooth formations are provided on the underside of the plunger head, and flexing parts which engage them on the pump body. Or, directional (ratchet tooth or pawl) elements could undergo the primary resilient flexion as in the sixth embodiment shown above with the folding tabs.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

We claim:

1. A moveable nozzle, reciprocating pump comprising:

a cap having a central aperture;

a body having a body insert received coaxially within a cylindrical component, wherein the cylindrical component has a top annular rim protruding through the central aperture, a radial flange engaging an underside of the cap, and a lower portion defining a pumping chamber with a chamber inlet and wherein the body insert has locking threads, a collar attached to the top annular rim, and a bottom end serving as a top edge of the pumping chamber and defining a central hole;

a plunger having a head with a cylindrical skirt having locking threads formed on an inward facing of the cylindrical skirt, said head configured to rotationally engage the locking threads of the body insert, and a hollow stem defining an unobstructed discharge channel with a dispensing nozzle at an upper end of the stem and one or more radially-directed inlets positioned at a lower end of the stem, wherein the stem extends coaxially through the central hole so that the one or more radially-directed inlets remain positioned in the pumping chamber;

a sliding piston positioned around the stem and configured to slide axially along the stem within the pumping chamber as the plunger reciprocates, wherein the sliding piston seals and defines a variable upper boundary of the pumping chamber;

a spring positioned coaxially around an exterior of the stem, with the spring seated on a floor of the plunger around the central hole and urging a tubular extension on the head away from the floor; and wherein a stop abutment on the lower end of the stem defines a lowest position for the sliding piston in which the one or more radially-directed inlets are closed by way of being obstructed by the sliding piston in the lowest position and wherein the sliding piston temporarily moves axially upward so that the one or more radially-directed inlets are temporarily open and fluid flow into and through the discharge channel only occurs as the plunger is being depressed.

2. The pump of claim 1 wherein the sliding piston includes double wipers sealing the sliding piston to an inner wall of the pump chamber.

3. The pump of claim 1 wherein the stem includes an end plug.

4. The pump of claim 3 wherein the end plug sealingly blocks the chamber inlet when the locking threads of the plunger and the body are engaged.

5. The pump of claim 3 wherein the stop abutment on the plunger is a shoulder portion formed at the end of the stem.

6. The pump of claim 5 wherein the sliding piston includes a cooperating shoulder that engages the stop abutment.

7. The pump of claim 1 wherein the sliding piston includes a cooperating shoulder that engages the stop abutment.

8. The pump of claim 1 wherein a top facing of the bottom end of the body insert serves as a seat for a pump spring.

9. The pump of claim 1 wherein catch formations are: i) provided on the plunger and the body and ii) configured to prevent or inhibit the onset of rotation of the plunger relative to the body.

10. The pump of claim 9 wherein the catch formations on the plunger include at least one radially extending rib formed on the head.

11. The pump of claim 9 wherein the catch formations on the body include at least one abutment face formed on the body insert.

12. The pump of claim 11 wherein the abutment face is one or more radially projecting teeth.

* * * * *